United States Patent Office 3,661,931
Patented May 9, 1972

3,661,931
PROCESS FOR PREPARING 1-METHYL-2,3,5,6-TET-RAHYDRO - 5 - SEMICARBAZIDO-6-HYDROXY-INDOLE - 3 - SULPHONIC ACID AND ALKALI METAL SALTS THEREOF
Giorgio Giommoni, Via Massena 2/A, Milan, Italy
No Drawing. Filed June 11, 1969, Ser. No. 832,474
Claims priority, application Italy, June 25, 1968, 18,183/68
Int. Cl. C07d *27/34*
U.S. Cl. 260—326.11
9 Claims

ABSTRACT OF THE DISCLOSURE

A process for preparing 1-methyl-2,3,5,6-tetrahydro-5-semicarbazido-6-oxo - indole - 3 - sulphonic acid wherein adrenaline is reacted with an aqueous solution of alkali metal sulphite to obtain a compound which is then treated with a moderate oxidizing agent and semicarbazide to give the alkali metal salt of 1-methyl-2,3,5,6-tetrahydro-5-semicarbazido-6-oxo-indole-3-sulphonic acid from which the free acid is obtained by acidifying the aqueous solution of said salt.

---

The present invention relates to a process for preparing 1-methyl-2,3,5,6-tetrahydro - 5 - semicarbazido - 6 - oxo-indole-3-sulphonic acid and alkali metal salts thereof.

Said acid and salts thereof are per se well known; these acids and salts are associated with a strong hemostatic action.

Several processes are known for obtaining the above mentioned acid and alkali metal satls thereof; however these have a number of drawbacks which consist of the requirement of an exceedingly extended period of time for the completion thereof, or difficulties in the purification of the final product.

The above drawbacks are overcome according to the process of the present invention. The present process is characterised in that adrenaline is reacted with an aqueous solution of alkali metal sulphite or bisulphite to obtain 1-(3,4-dihydroxyphenyl)-2-methylamino-ethanesulphonic acid which, in an aqueous solution brought to a substantially neutral pH and to a temperature of from 0–40° C., is treated with a moderate oxidising agent and semicarbazide, thus obtaining the alkali metal salt of 1-methyl-2,3,5,6-tetrahydro-5-semicarbazido-6-oxo-indole-3-sulphonic acid which is separated, the free acid being obtainable by acidifying the aqueous solution of said alkali metal salt.

Preferably the above mentioned aqueous solution brought to a substantially neutral pH is at a temperature of 20–30° C.

The above process is particularly useful owing to its rapidity in execution, as it can be completed within 4–6 hours; the process is also useful because it utilises as intermediate a sulphonic acid derived from adrenaline exhibiting a substantially higher stability than said adrenaline.

According to a prefererd embodiment of the present process, adrenaline is prepared, in turn, extemporaneously and without being isolated by hydrogenating an aqueous solution of adrenalone hydrochloride; this modified process is of a particularly economical advantage because of removing the difficulties pending the isolation and preservation of adrenaline.

Potassium ferricyanide is preferably used as oxidising agent. The oxidising agent and semicarbazide can be added one after the other, or simultaneously to the neutralized acid solution.

The aqueous solution of 1-(3,4-dihydroxyphenyl)-2-methylamino-ethanesulphonic acid is brought to substantially neutral pH preferably by adding alkali metal carbonates or bicarbonates.

In order that the process be more clearly understood, two embodiments thereof will now be described by way of example and not in a limiting sense.

EXAMPLE I 20 gr. adrenalone hydrochloride dissolved in water were mixed with 2 gr. 5% palladium on carbon and the suspension was hydrogenated under vigorous stirring until gas absorption had ceased. A solution of adrenaline hydrochloride was obtained which, after filtering to free it from the catalyst, was then neutralised with sodium bicarbonate and brought to pH 7 and a temperature of 25° C. and then treated with a saturated solution of sodium bisulphite extemporaneously prepared by saturating a water solution of 5.8 gr. sodium carbonate with sulphur dioxide. The solution was heated under reflux for one hour and then vacuum dried: the residue was crystallized from 10% acetic acid to give a yield of 24 gr. 1-(3,4-dihydroxyphenyl)-2-methylamino-ethanesulphonic acid, M.P. 260–1° C.

A solution of 10 gr. 1-(3,4-dihydroxyphenyl)-2-methylamino-ethanesulphonic acid, 17 gr. $NaHCO_3$ and 110 cc. water was reacted under vigorous stirring with 53 gr. potassium ferricyanide at 25° C., immediately adding thereto a solution of 5.8 gr. semicarbazide hydrochloride, 7.2 gr. sodium acetate and 15 cc. water; after one hour stirring at 25° C. and then cooling to 0° C., the separation was obtained of the sodium salt of 1-methyl-2,3,5,6-tetrahydro-5-semicarbazido-6-oxo-indole-3-sulphonic acid.

EXAMPLE II 18.3 gr. adrenaline were added to an aqueous solution of sodium bisulphite prepared by bubbling $SO_2$ into a solution of 6.4 gr. sodium carbonate in 100 cc. water until saturation occurs. The suspension was heated under reflux for one and a half hour, the final solution being then concentrated to vacuum dryness and the residue being treated with 100 cc. 10% acetic acid at 0° C. An insoluble product was obtained which was filtered, yielding 22 gr. 1 - (3,4-dihydroxyphenyl)-2-methylamino-ethanesulphonic acid.

10 gr. 1-(3,4-dihydroxyphenyl)-2-methylamino-ethanesulfonic acid were dissolved in 90 cc. water, the solution then being brought to pH 8 with sodium hydroxide at 10° C. Under vigorous stirring, the solution was simultaneously added with 53 gr. potassium ferricyanide to an aqueous solution prepared by dissolving 5.8 gr. semicarbazide hydrochloride and 7.2 gr. sodium acetate in 15 cc. water.

The dark red coloured final solution was vigorously stirred for one and a half hours at room temperature and then cooled to 0° C.

A precipitate was obtained of the sodium salt of 1-methyl-2,3,5,6-tetrahydro-5-semicarbazido-6-oxo-indole-3-sulphonic acid, M.P. 227–8° C.

The whole process, as described in this example, was completed in less than 6 hours.

From sodium salts, the preparation of which has been described in the examples herein, it is possible to obtain the corresponding free acid by treating said salts in an aqueous solution with strong mineral acids, then filtering the resulting precipitate. This acid melts with decomposition at 190–5° C.

What I claim is:
1. A process for preparing 1-methyl-2,3,5,6-tetrahydro-5-semicarbazido-6-oxo-indole-3-sulphonic acid and alkali metal salts thereof, wherein adrenaline is reacted with an aqueous solution of alkali metal sulphite or bisulphite to obtain 1-(3,4-dihydroxyphenyl)-2-methylamino-ethanesulphonic acid which, in a solution in water brought to a substantially neutral pH and to a temperature of from 0–40° C., is treated with potassium ferricyanide and semicarbazide, obtaining thereby the alkali metal salt of 1-methyl - 2,3,5,6 - tetrahydro - 5 - semicarbazido-6-oxo-indole-3-sulphonic acid which is separated, the free acid being obtainable by acidifying the aqueous solution of said salt.

2. A process according to claim 1, wherein said aqueous solution brought to a substantially neutral pH is at a temperature of 20–30° C.

3. A process according to claim 2, wherein said aqueous solution is brought to a substantially neutral pH by treatment with alkali metal carbonates or bicarbonates.

4. A process according to claim 1, wherein said neutralized solution of 1-(3,4-dihydroxyphenyl) - 2 - methyl-amino-ethanesulphonic acid is treated first with said potassium ferricyanide and then with semicarbazide.

5. A process according to claim 3, wherein said neutralized solution of 1-(3,4-dihydroxyphenyl)-2-methyl-amino-ethanesulphonic acid is treated first with said potassium ferricyanide and then with semicarbazide.

6. A process according to claim 1, wherein said neutralized solution of 1-(3,4-dihydroxyphenyl)-2-methyl-amino-ethanesulphonic acid is treated simultaneously with said potassium ferricyanide and semicarbazide.

7. A process according to claim 3, wherein said neutralized solution of 1-(3,4-dihydroxyphenyl)-2-methyl-amino-ethanesulphonic acid is treated simultaneously with said potassium ferricyanide and semicarbazide.

8. A process according to claim 1, wherein said adrenalin is obtained in situ by treating an aqueous solution of adrenalone hydrochloride with hydrogen in the presence of hydrogenating catalyst.

9. A process according to claim 8, wherein said adrenalin is obtained in situ by treating an aqueous solution of adrenalone hydrochloride with hydrogen in the presence of hydrogenating catalyst.

References Cited
UNITED STATES PATENTS 2,566,259  8/1951  Thirtle et al. __ 260—326.11 X ALEX MAZEL, Primary Examiner J. A. NARCAVAGE, Assistant Examiner U.S. Cl. X.R.

260—999